United States Patent
Ferguson et al.

(10) Patent No.: US 7,119,149 B2
(45) Date of Patent: Oct. 10, 2006

(54) HIGH EXPANSION TWO-COMPONENT STRUCTURAL FOAM

(75) Inventors: Gregory A. Ferguson, Harrison Township, MI (US); Rajat K. Agarwal, Neckargemuend (DE); Vettithara C. Koshy, Bloomfield Hills, MI (US)

(73) Assignee: Henkel Kommanditgesellschaft AUF, Duesseldorf (DE)

( * ) Notice: Subject to any disclaimer, the term of this patent is extended or adjusted under 35 U.S.C. 154(b) by 127 days.

(21) Appl. No.: 10/336,594

(22) Filed: Jan. 3, 2003

(65) Prior Publication Data

US 2004/0131840 A1    Jul. 8, 2004

(51) Int. Cl.
  *C08F 8/00*    (2006.01)

(52) U.S. Cl. ............... 525/330.9; 525/331.3; 428/317.9; 521/135; 521/178; 523/219

(58) Field of Classification Search ............. 428/317.9; 521/219, 54, 89, 94, 95, 135, 140, 178
See application file for complete search history.

(56) References Cited

U.S. PATENT DOCUMENTS

| | | | | |
|---|---|---|---|---|
| 2,575,558 A | 11/1951 | Newey et al. | ............... | 156/330 |
| 3,296,153 A | 1/1967 | Snogren | ............... | 260/2.5 |
| 4,161,202 A * | 7/1979 | Powell et al. | ............... | 152/504 |
| 4,995,545 A | 2/1991 | Wycech | ............... | 228/119 |
| 5,274,006 A | 12/1993 | Kagoshima et al. | ............... | 521/85 |
| 5,804,608 A | 9/1998 | Nakazato et al. | ............... | 521/135 |
| 6,040,350 A | 3/2000 | Fukui | ............... | 521/135 |
| 6,103,152 A * | 8/2000 | Gehlsen et al. | ............... | 264/45.4 |
| 6,387,470 B1 | 5/2002 | Chang et al. | ............... | 428/121 |
| 6,451,876 B1 * | 9/2002 | Koshy | ............... | 523/219 |
| 6,479,560 B1 | 11/2002 | Freitag et al. | | |
| 2002/0187305 A1 | 12/2002 | Czaplicki et al. | ............ | 428/143 |
| 2003/0060522 A1 | 3/2003 | Czaplicki et al. | ............ | 521/50 |
| 2003/0060523 A1 | 3/2003 | Czaplicki et al. | ............ | 521/50 |
| 2003/0060623 A1 | 3/2003 | Czaplicki | | |
| 2003/0105175 A1 | 6/2003 | Czaplicki et al. | | |
| 2003/0186049 A1 | 10/2003 | Czaplicki et al. | | |
| 2005/0016677 A1 | 1/2005 | Carlson et al. | | |

FOREIGN PATENT DOCUMENTS

WO    WO 02/31077 A2    4/2002
WO    WO 02/090427 A1    11/2002

OTHER PUBLICATIONS

Hull et al., "Epoxy Curing Agents", Marcel Dekker, Inc., Handbook of Coatings, Additives, vol. 2, 1992 pp. 277-299.
Second Edition of the Encyclopedia of Polymer Science and Engineering, vol. 6, pp. 322-382 (1986).

* cited by examiner

*Primary Examiner*—Hai Vo
(74) *Attorney, Agent, or Firm*—Connolly Bove Lodge & Hutz LLP

(57) ABSTRACT

The present invention is directed to a high expansion two-component structural foam that expands to about twice its original volume while maintaining good cell structure. The foam of the present invention is based on epoxy resins. Each component of the foam system exhibits storage stability, e.g., no phase separation, yet reacts when combined to provide a cured material having exceptionally good compression strength and modulus. The blowing system used to prepare the foam produces a foam which is uniform in appearance and is essentially free of the large voids often found in conventional two-part thermosettable compositions, even when a relatively large mass is utilized.

32 Claims, No Drawings

HIGH EXPANSION TWO-COMPONENT STRUCTURAL FOAM

FIELD OF THE INVENTION

The present invention is directed to a high expansion two-component structural foam that expands to about twice its volume while maintaining good cell structure. The foam of the present invention is based on epoxy resins. Each component of the foam system exhibits storage stability, e.g., no phase separation, yet reacts when combined to provide a cured material having exceptionally good compression strength and modulus. The blowing system present in the foam produces a foam which is uniform in appearance and is essentially free of the large voids often found in conventional two-part thermosettable compositions, even when a relatively large mass is utilized.

BACKGROUND OF THE INVENTION

In many new commercial applications for weight reduction, it is required to fill hollow structural members with structural foam as an alternative to metal reinforcement. The use of structural foams enables designers to reduce weight of structural members while maintaining stiffness and structural strength. Methods of reinforcing hollow structural members using two-part, epoxy-resin based systems are known in the art, as illustrated by U.S. Pat. No. 4,995,545, which is incorporated herein by reference in its entirety. This reference discloses a two-part epoxy-based system, where the first part is a mixture of thermosetting resin and expandable microspheres, preferably also containing a filler such as hollow glass microspheres in an amount effective to provide a paste-like consistency. The second part includes a curing agent, which is effective to cross-link and cure the thermosetting resin present in the first part when the two parts are combined. Additionally, the second part contains a filler, such as hollow glass microspheres. Upon mixing, an exothermic reaction takes place, causing the expandable microspheres to increase in size and thereby foaming the composition.

U.S. Pat. No. 4,995,545 suggests that suitable curing agents for the second part of the system are primary polyamines, secondary polyamines, and polyamides (including aliphatic amidoamines). One problem that has arisen with two-part systems described in U.S. Pat. No. 4,995,545 is that, although the second part has good chemical stability at ambient temperatures, the curatives tend to phase separate from the hollow glass microsphere filler material.

In particular, when the material is stored in a 55-gallon drum, the hollow glass microspheres phase separate to form a hard top layer over a bottom liquid layer containing the curatives. Additionally, the curing agent side phase separates when heated and/or when pressure is applied, even when freshly prepared. The liquid curing agents tend to drip, for example, when the curing side agent is heated to about 66° C. (150° F.) and subjected to an application pressure of about 35 kg/cm$^2$ (500 psi). These problems make it quite difficult to dispense or handle the curing side agent by pumping, as would be desirable in an OEM vehicle assembly operation. Therefore, it is desirable to develop a second part that exhibits better storage and processing stability and is pumpable at elevated temperatures and pressures.

Another problem with the prior art two-part systems is the tendency for large voids or holes to develop in the thermosettable composition as the heat generated by the exothermic reaction of the two parts expands the expandable microspheres. The problem is especially pronounced when reactive diluents having relatively low boiling points are present in the first part of the two part system and when a comparatively large mass of the thermosettable composition is being used. The non-uniformity of the resulting foam limits the compression strength and modulus levels which can be attained with such systems. Since these properties are critical when the foam is to be used to reinforce a hollow structural member, it is desirable to have a two part system exhibiting more controlled foaming and a more uniform cell structure.

Obtaining a foamed epoxy resin with an optimum cellular structure is recognized as quite challenging, as there are a number of interrelated parameters which affect the foaming/curing process. For example, the rheology of the epoxy/curative mixture during the rise of the foam is important. As the epoxy resin crosslinks and cures, the mixture becomes more viscous. This is believed to be necessary to retain the cellular structure produced by expansion of the blowing agent. Coalescence and collapse of the foam will occur if the mixture is insufficiently viscous. On the other hand, a mixture which becomes extremely viscous and gels or sets up too quickly may prematurely terminate the foam rise, interfering with the full expansion and density reduction of the foam. Controlling the viscosity of the foam is not straightforward, especially since it will vary with the temperature of the mixture, which often changes significantly during the course of curing/foaming and within the mass of the reacting mixture (the core temperature will often, for example, be much higher than the temperature at the outer edges). Another process parameter related to foam rheology is the epoxy cure rate, which is dependent on the processing temperature as well as the chosen epoxy resin and curing agent. If the epoxy-curative system is fast-reacting with a large exotherm, the cure rate may be too rapid to allow the foam to rise. Further, the excessive heat from a large exotherm can lead to burning or charring of the foam interior. If the epoxy reacts too slowly, the exotherm may not be sufficient to fully activate the blowing agent. Other processing parameters which influence foam quality and cell structure include surface tension and cell nucleation.

A problem with two-component foams of the prior art is that as larger amounts of blowing agent were used to increase foam expansion, the foam structure degraded due to thermal decomposition of the blowing agent and breakdown of the expanded foam cell structure. The inventors have unexpectedly found that a solution to this problem of the prior art is to employ a blowing system comprising at least two blowing agents. One of the blowing agents has a low onset temperature and the other has a high onset temperature. Such a blowing system allows for high levels of expansion while maintaining a good cell structure that provides a lightweight and high strength expanded foam.

SUMMARY OF THE INVENTION

The present invention provides a two-component system capable of being cured to provide a structural reinforcement foam. The structural foam has high specific volume characteristics with uniform cell distribution. The use of the foam allows for reduced component weight and improved stiffness and strength compared to the prior art. The uniform expansion of the foam requires a blowing system comprising a unique blend of at least two blowing agents to obtain maximum performance.

One component (Component A) comprises one or more epoxy resins. In a preferred embodiment, Component A comprises at least one epoxy resin which is glycidyl ether of a polyhydric phenol, a blowing system comprising at least two thermally-activated blowing agents such as expandable microspheres, at least one reactive diluent, at least one rubber (preferably a liquid nitrile rubber), hollow glass microspheres, and at least one thixotropic agent.

The curative system of Component B comprises at least one amine curative. Amine curatives include but are not limited to aliphatic polyamines and amidoamines. Preferably, the curative system of Component B comprises at least one aliphatic polyamine, at least one amidoamine, at least one alcohol, and at least one adduct of a polyamine and an epoxide. Hollow inorganic (preferably glass) microspheres are present in one or both of Components A and B.

Combining the two components initiates exothermic reaction of the epoxy resin(s) and the curative system. The heat evolved from the reaction causes the blowing system to activate and foam the mixture. The curing and expansion of the foam proceeds in a remarkably controlled fashion to provide a foam having uniform cell structure. Minimal gassing, burning, or cracking takes place in the interior of the foam, even when a relatively large mass of the two component system is employed. This was quite surprising, since normally considerable problems are encountered when attempting to cure and foam a large quantity of an epoxy resin due to the greater potential for developing high internal (core) temperatures as compared to a small quantity where dissipation of the heat generated during the exothermic reaction can take place more readily. The ability to reproducibly obtain a foam of consistent quality was also unexpected in view of the difficulties generally encountered in trying to control and adjust all of the different processing parameters known to affect expansion of an epoxy resin during cure.

The unique blowing system comprising at least two blowing agents allows for higher expansion of the foam while avoiding the degradation seen in foams of the prior art. The blowing system comprises a first high-temperature thermally-activated blowing agent and a second low-temperature thermally-activated blowing agent. The high-temperature blowing agent has high thermal properties and high onset temperature. The low-temperature blowing agent has lower thermal properties and a lower onset temperature relative to the first blowing agent.

In one embodiment of the invention, the high- and low-temperature blowing agents of the blowing system are present together in one component of the two-component system. Preferably, the blowing agents of the blowing system are both present in Component A. Alternatively, the high- and low-temperature blowing agents may be present in separate components of the two-component system. For example, the high-temperature agent(s) may be present in Component A and the low-temperature agent(s) may be present in Component B. Moreover, each of Components A and B of the two-component system may contain a fraction of either the high- and low-temperature blowing agents so that, when combined, the two-component system includes the blowing system comprising both the high- and low-temperature blowing agents.

While not intending to be bound to this theory, the inventors believe that the high-temperature blowing agent provides for expansion of the core foam where temperatures are higher due to the exothermic nature of the curing reaction. The low-temperature blowing agent provides for expansion of the perimeter foam where temperatures are relatively lower than that of the core. The inventors have unexpectedly found that the unique combination of high and low-temperature blowing agents provides for an expandable foam that expands at both the core and the perimeter and has a high degree of expansion, e.g., about 100 percent. The good cell structure of the resulting foam gives the foam high strength while also reducing the weight of the foam.

When cured, foams provided by the present invention can have compression strengths in the range of from about 5 MPa to about 30 MPa (about 725 to 4,400 psi) and a modulus in the range of from about 400 MPa to about 1,400 MPa (about 58,000 to about 200,000 psi). The foams also may have remarkably high compression strength, e.g., about 10 MPa (about 1,500 psi) at 80° C. (175° F.). Without wishing to be bound by theory, it is believed that this may be attributable to the highly crosslinked character and the resulting relatively high glass transition temperature of the organic component of the foam. The two-component system of the present invention is well suited for reinforcing parts which are exposed to elevated temperatures such as, for example, structural members which are located near the exhaust system of a vehicle.

DETAILED DESCRIPTION OF THE INVENTION

The two-component foam of the present invention comprises a Component A and a Component B. Component A comprises one or more epoxy resins. Component B of the present invention comprises a curative system known in the art to be used in two-component expandable epoxy resin-based foams. In particular, the curative system of Component B comprises at least one amine curative. In a preferred embodiment of the present invention, the curative system contains at least one aliphatic polyamine, at least one amidoamine, at least one alcohol; and at least one adduct of a polyamine and epoxide. This preferred embodiment of Component B for use with the present invention is described in U.S. Pat. No. 6,451,876, which is incorporated by reference.

The blowing system of the invention comprises at least two thermally-activated blowing agents. The blowing system must contain at least one high-temperature thermally-activated blowing agent and at least one low-temperature thermally activated blowing agent to obtain a structural reinforcing foam having a uniform cell structure which is substantially free of large holes or voids and which has improved compression strength and modulus.

Use of the blowing system is critical in obtaining the expandable or foamable thermosettable compositions of the present invention. As stated above, the blowing system comprises at least two blowing agents—at least one high-temperature blowing agent and at least one low-temperature blowing agent. The high- and low-temperature blowing agents are both thermally activated (i.e., latent blowing agents) so that the component containing said blowing agent is stable at normal storage temperatures. When the blowing agents are heated to their onset temperature, they begin to expand.

In one embodiment of the invention, the high- and low-temperature blowing agents of the blowing system are present together in one component of the two-component system. Preferably, the blowing agents of the blowing system are both present in Component A. Alternatively, the high- and low-temperature blowing agents may be present in separate components of the two-component system. For example, the high-temperature agent(s) may be present in Component A and the low-temperature agent(s) may be present in Component B. Moreover, each of Components A and B of the two-component system may contain a fraction of either the high- and low-temperature blowing agents so that, when combined, the two-component system includes the blowing system comprising both the high- and low-temperature blowing agents. Selection of a particular blowing agent being present in a particular component of the two-component system should be based on the compatibility of the particular blowing agent with the particular blowing system.

According to the invention, the high-temperature blowing agent has a relatively high onset, or starting, temperature in the range of from about 110° C. to about 150° C. and a maximum temperature (when the blowing agent is in the form of expandable microspheres) in the range of from about 165° C. to about 210° C. Preferably, the high-temperature blowing agent has an onset temperature in the range of about 110° C. to about 130° C. and a maximum temperature in the range of from about 180° C. to about 195° C. The low-temperature blowing agent has a relatively low onset, or starting, temperature in the range of from about 75° C. to about 105° C. and a maximum temperature (when the blowing agent is in the form of expandable microspheres) in the range of from about 115° C. to about 150° C. Preferably, the low-temperature blowing agent has an onset temperature in the range of about 90° C. to about 100° C. and a maximum temperature in the range of from about 135° C. to about 150° C. The onset temperature is that temperature where the blowing agent begins to expand. The maximum temperature is that temperature where the thermoplastic shell of blowing agent begins to chemically or physically break down.

An important characteristic of the present invention is that the blowing system comprise a suitable amount of both the high- and low-temperature blowing agents. During the exothermic curing reaction, the internal temperature of the foam can exceed 170° C. This internal foam temperature is typically in excess of the maximum temperature of the low-temperature thermally-activated blowing agent.

The inventors have found that using large amounts of low-temperature thermally-activated blowing agent, such as expandable microspheres, results in large voids in the expanded foam. It is believed that these voids are caused by the thermal breakdown of the low-temperature expandable microspheres. To avoid this problem, high-temperature expandable microspheres could be used, however, the inventors have also found that a certain amount of low-temperature thermally-activated blowing agent is required for uniform expansion of the foam. Without the low-temperature thermally-activated blowing agent, expansion only occurs in the center of the foam, not at the edge.

Accordingly, it is preferred in the present invention that the blowing system comprise a weight ratio in the range of from about 1:1 to about 7:1 of the high-temperature blowing agent to the low-temperature blowing agent respectively. More preferably, the weight ratio of high- to low-temperature blowing agents is in the range of from about 2:1 to about 6:1. Most preferably, the weight ratio is about 2.5:1.

Upon mixing of Components A and B, the resulting thermosettable composition foams or expands as a result of the activation of the blowing agents in the blowing system by the heat generated from the exothermic crosslinking reaction of the curing system and the epoxy resin. By expanding in this manner, the thermosettable composition fills the cavity in which it is disposed. Good adhesion to the interior surfaces of the cavity is obtained, as the expanding thermosettable composition is capable of occupying voids and irregularities in said surfaces. This high degree of contact with the cavity surfaces serves to enhance the final physical properties of the resulting reinforced cavity. At the same time, however, the weight increase is minimized due to the relatively low density of the thermoset foam.

Preferably, expandable thermoplastic resin microspheres (which can comprise, for example, volatile physical blowing agents such as hydrocarbons or halocarbons encapsulated in thermoplastic shells) are employed in the blowing system to render the thermosettable composition foamable. The thermoplastic shells may be comprised of acrylic-type resins such as polymethylmethacrylate, acrylic-modified polystyrene, polyvinylidene chloride, styrene/MMA copolymers and the like. Expandable thermoplastic resin microspheres suitable for the invention have an average particle size in the range of about 5 to about 100 μm. Particularly preferred expandable microspheres are available from, for example, Akzo Nobel AB under the trademark EXPANCEL. An EXPANCEL expandable microsphere consists of a thermoplastic shell encapsulating a volatile hydrocarbon.

As stated above, the selection of a particular blowing agent being present in a particular component of the two-component system should be based on the compatibility of the particular blowing agent with the particular blowing system. The need for some compatibility of the particular blowing agents with either Component A or Component B can be seen in a preferred embodiment of the invention where the blowing system comprises EXPANCEL expandable microspheres. Typically, EXPANCEL expandable microspheres are acidic, however, a preferred embodiment of Component B is basic. Therefore, any blowing agent to be incorporated into this Component B would need to be compatible with a basic environment. EXPANCEL 053 DU, similar to EXPANCEL 551 DU, is basic and could be with the Component B of this preferred embodiment.

The expandable microspheres are incorporated into Component A, Component B or both Component A and B in their unexpanded state. When an expandable microsphere is heated, the thermoplastic shell of the expandable microsphere softens and at the same time the pressure of the encapsulated hydrocarbon increases. This causes the shell to stretch and expand in much the same way as a balloon. When the heat is removed, the shell stiffens and the microsphere remains in its new expanded form.

In general, the maximum temperature that an expandable microsphere can withstand is determined by the combination of the break down of the shell plus the pressure of the gas. However, at a certain point the chemistry of the microsphere comes into play, decomposing at very high-temperatures. The shell will collapse due to the wall strength becoming too weak to contain the gas. At this point, even a pin hole will cause the breakdown of the shell. In the present invention, the high-temperature expandable microspheres also have a higher maximum temperature compared to the low-temperature expandable microspheres.

The onset temperature and maximum temperature of expandable microspheres are determined using the following method. A small quantity of expandable microspheres are placed into a Dynamic Mechanical Analyzer (DMA) sample cup, which is a small steel cup. There is an arm with a steel plunger at the tip which is lowered into the sample cup until it's almost touching the sample of expandable microspheres. The diameter of the plunger is slightly smaller than that of the sample cup, so that the plunger just fits inside the sample cup. A slight force is applied to the plunger, so that it will not move freely. The force of the microspheres expanding and pushing against the plunger will cause it to move upwards. The oven doors are slid into place around the sample cup/plunger. The oven is heated, causing the microspheres to expand and eventually fail. A DMA graph plots Delta L on the left axis, temperature on the right, and seconds along the bottom. The shape of the expansion curve resembles a bell curve. The $T_{start}$ (onset temperature) of the expandable microspheres is the temperature at which the Delta L starts increasing vertically. The distance the plunger moves upward from its original position is the expansion (Delta L) of the microsphere. The $T_{max}$ (maximum temperature) of the sample is identified at the point where, after expanding, the Delta L begins to drop. This drop in Delta L is caused by the microsphere collapsing. Alternatively, one could use a Thermal Mechanical Analyzer (TMA) in the above method with modifications as necessary that would be known to those skilled in the art.

The preferred high-temperature expandable microspheres are those having an onset temperature in the range of about 110° C. to about 130° C. and a maximum temperature in the range of from about 180° C. to about 195° C. Such high-temperature expandable microspheres are available from, for example, Akzo Nobel AB as EXPANCEL 091 DU. These preferred high-temperature expandable microspheres have a particle size in the range of 10 to 45 μm.

The preferred low-temperature expandable microspheres are those that have an onset temperature in the range of about 90° C. to about 100° C. and a maximum temperature in the range of from about 135° C. to about 150° C. Such low-temperature expandable microspheres are available from, for example, Akzo Nobel AB as EXPANCEL 551 DU. These preferred low-temperature expandable microspheres have a particle size in the range of 10 to 24 μm.

The amount and type of expandable microspheres utilized in the blowing system may each be readily varied to obtain the desired degree of expansion (typically, from about 5% to about 150%; in preferred embodiments, from about 75% to about 125%).

Chemical blowing agents may be used in conjunction with, or substituted for, either or both of the above-described high- and low-temperature expandable microspheres in the blowing system if the chemical blowing agents have similar onset temperature characteristics to the expandable microspheres. Any of the chemical blowing agents known in the art may be employed, such as, for example, azodicarbonamide and sulfonyl hydrazides.

The curative system of Component B comprises at least one amine curative. Amine curatives include but are not limited to aliphatic polyamines and amidoamines. In a preferred embodiment, the curative system of Component B comprises at least one aliphatic polyamine, at least one amidoamine, at least one alcohol, and at least one adduct of a polyamine and an epoxide.

Aliphatic polyamines for use in the curative system include the class of organic substances containing two or more nitrogen atoms and having an aliphatic character. Preferably, at least two primary and/or secondary amine groups are present in the aliphatic polyamine. Aliphatic polyamines are well-known in the art of epoxy curing agents and are described, for example, in U.S. Pat. No. 2,575,558 (incorporated herein by reference in its entirety) and Hull et al., "Epoxy Curing Agents", pp. 277–299.

Polyalkylene polyamines are a preferred class of aliphatic polyamines, with the polyethylene polyamines being especially preferred. In one embodiment of the invention, the aliphatic polyamine corresponds to the generic structure:

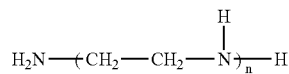

wherein n preferably is 1–6. Specific examples of such aliphatic polyamines include diethylene triamine, triethylene tetramine, and tetraethylene pentamine.

The amine curative may comprise at least one amidoamine. Suitable amidoamines include the class of organic substances obtainable by reacting one or more monobasic fatty acids with aliphatic polyamines. The use of tall fatty oil acids is especially preferred. Preferred aliphatic polyamines for reaction with the monobasic fatty acids include the polyalkylene polyamines described above. As used herein, the term "amidoamine" includes, not only the simple amidoamines initially formed in the fatty acid reaction, but also the imidazoline containing products obtainable by further reacting the simple amidoamines to effect ring closure. Amidoamines are well-known in the art and are described in the aforementioned Hull et al. reference. Suitable amidoamines are also available from commercial sources, and include the products sold by Shell Chemicals under the designations: EPI-CURE 3010, EPI-CURE 3015, EPI-CURE 3025, EPI-CURE 3030, EPI-CURE 3046, EPI-CURE 3055 (an especially-preferred amidoamine), EPI-CURE 3060, EPI-CURE 3061, EPI-CURE 3070, EPI-CURE 3072, and EPI-CURE 3090.

Suitable alcohols for the curative system include the class of organic substances containing one or more —OH groups, preferably at least two —OH groups. While aliphatic alcohols may be used, aromatic alcohols, e.g., phenols, are generally preferred. Polyhydric phenols, i.e., phenols having two or more hydroxy groups attached to aromatic rings are especially preferred for use in the present invention. Bisphenol A is an example of a particularly preferred polyhydric phenol. Other illustrative polyhydric phenols include but are not limited to, bisphenol F, phenol-formaldehyde, and cresol-formaldehyde condensates (novolacs), bisphenol AS, catechol, resorcinol, and the like. The alcohol may be supplied to the curative system in the form of a mixture with an aliphatic polyamine. For example, EPI-CURE 3271, a curative which is a mixture of diethylene triamine and bisphenol A (available from Shell Chemicals) may be utilized.

The curative system of Component B may include one or more polyamine/epoxide adducts. Such adducts are formed by reaction of a compound having two or more primary and/or secondary amine groups and a compound having at least one epoxy group (preferably, no more than one epoxy group). The polyamine is preferably aliphatic, more preferably a polyalkylene polyamine, most preferably a polyethylene polyamine such as diethylene triamine, triethylene tetramine, or tetraethylene pentamine. Preferably, an excess of amine is used so that the adduct contains some proportion of primary and/or secondary amine groups. Suitable epoxides include monoepoxides such as epoxides of $C_2$–$C_{20}$ mono-olefins such as ethylene oxide, propylene oxide and longer chain epoxides, monoglycidyl ethers, e.g., butyl glycidyl ether, and monoglycidyl esters. Adducts derived from glycidyl esters of $C_2$–$C_{24}$ aliphatic carboxylic acids (especially branched carboxylic acids containing at least one tertiary or quaternary carbon atom, including $C_2$–$C_{22}$ alpha, alpha-dialkylalkane, and alpha-alkylalkane monocarboxylic acids such as tert-decanoic acid and the like) give particularly favorable results in the present invention. Suitable epoxide/amine adducts are readily available from commercial sources. For example, EPI-CURE 3295 curative, which is a mixture of triethylene tetramine and an adduct of triethylene tetramine and CARDURA E10 tert-decanoic acid oxiranyl methyl ester available from Shell Chemicals has been found to work exceptionally well.

Any of the thermosettable resins having an average of more than one (preferably about two or more) epoxy groups per molecule known or referred to in the art may be utilized as the epoxy resin component of the present invention.

Epoxy resins are described, for example, in the chapter entitled "Epoxy Resins" in the Second Edition of the Encyclopedia of Polymer Science and Engineering, Volume 6, pp. 322–382 (1986). Exemplary epoxy resins include polyglycidyl ethers obtained by reacting polyhydric phenols such as bisphenol A, bisphenol F, bisphenol AD, catechol, resorcinol, or polyhydric alcohols such as glycerin and polyethylene glycol with haloepoxides such as epichlorohydrin; glycidylether esters obtained by reacting hydroxycarboxylic acids such as phydroxybenzoic acid or beta-hydroxy naphthoic acid with epichlorohydrin or the like; poiyglycidyl esters obtained by reacting polycarboxylic acids such as phthalic acid, tetrahydrophthalic acid or terephthalic acid with epichlorohydrin or the like; epoxidated phenolic-novolac resins (sometimes also referred to as polyglycidyl ethers of phenolic novolac compounds); epoxidated polyolefins; glycidylated aminoalcohol compounds and aminophenol compounds, hydantoin diepoxides and urethane-modified epoxy resins. Mixtures of epoxy resins may be used if so desired; for example, mixtures of liquid (at room temperature), semi-solid, and/or solid epoxy resins can be employed. Any of the epoxy resins available from commercial sources are suitable for use in the present invention. Such commercially available epoxy resins are frequently mixtures obtained by reaction of polyhydric phenols with epichlorohydrin; these mixtures contain epoxy resin molecules varying somewhat in their degree of condensation. Preferably, the epoxy resin has an epoxide equivalent molecular weight of from about 150 to 1,000. The use of epoxy resins based on glycidyl ethers of bisphenol A is especially advantageous. The epoxy resin preferably contains an average of about 2 epoxy groups per molecule and should be selected so as to provide the desired combination of properties in both the thermosettable composition and the final cured thermoset and composite prepared therefrom.

Hollow inorganic microspheres (sometimes referred to as microbubbles or microballoons) may be added to Component A, Component B or both Component A and B to reduce the density of the thermoset while maintaining good strength and stiffness. Without wishing to be bound by theory, it is believed that the presence of hollow inorganic microspheres, particularly at relatively high loadings (e.g., at least about 15% by weight of the thermosettable composition), may play an important role in moderating the exothermic reaction by functioning as a heat sink as well as slowing the rate of reaction. The air contained in the microspheres can readily absorb energy, thereby regulating the temperature rise encountered upon mixing of Component A and Component B. Hollow glass microspheres are especially preferred for use.

Commercially available hollow glass microspheres include the materials sold by Minnesota Mining & Manufacturing under the trademark SCOTCHLITE, with suitable grades including those available under the designations B38, C15, K20 and VS 5500. The glass microspheres preferably have diameters in the range of from about 5 to 200 μm (preferably, no greater than 70 μm).

The crush strength of the hollow glass microspheres may be selected in accordance with the desired characteristics of the cured thermoset or composite containing such thermoset. If the two part system is to be processed or applied using conventional pumping equipment, it will be beneficial to use hollow glass microspheres having a crush strength of at least about 13.7 MPa (about 2,000 psi), more preferably at least about 20.5 MPa (about 3,000 psi), and most preferably at least about 27.5 MPa (about 4,000 psi).

Other types of fillers may also optionally be present in the thermosettable composition. Any of the conventional organic or inorganic fillers known in the thermosettable resin art may be used including, for example, silica (including fumed or pyrogenic silica, which may also function as a thixotropic or rheological control agent), calcium carbonate (including coated and/or precipitated calcium carbonate, which may also act as a thixotropic or rheological control agent, especially when it is in the form of fine particles), fibers (e.g., glass fibers, wollastonite fibers, carbon fibers, ceramic fibers, aramid fibers), calcium oxide, talc, hydrated aluminum silicate, feldspar, wollastonite (including high aspect wollastonite), alumina, clays, sand, metals (e.g., aluminum powder), macrospheres and microspheres comprised of materials such as glass, ceramics, thermoplastic resins, thermoset resins, and carbon (all of which may be solid or hollow, expanded or expandable) and the like.

In one embodiment of the invention, the ingredients of the thermosettable composition and the relative proportions of said ingredients are selected such that the thermosettable composition formed by combining Component A and Component B is pumpable. That is, such thermosettable composition is capable of being pumped into a hollow space or cavity where reinforcement is desired (such, as for example, a pillar or hydroformed part of a vehicle which is otherwise not readily accessible).

The thermosettable compositions of the invention may be formulated to include one or more additional components, including, for example, colorants, thixotropic agents (rheological control agents), toughening or flexibilizing agents (including rubbers), stabilizers, and the like. If the thermosettable composition viscosity is too low due to, for example, the presence of liquid components such as low molecular weight epoxy resins or reactive diluents, thixotropic agents such as fumed silica (especially hydrophobic fumed silica), coated calcium carbonate, clays, bentonites, and the like can be added. The type(s) and amount(s) of thixotropic agent(s) employed are, in certain embodiments of the invention, selected such that Component A, Component B, and/or the thermosettable composition obtained by mixing Components A and B flow at ambient temperatures only when subjected to high shear. It is particularly desirable that the thermosettable compositions obtained by mixing of Components A and B be non-flowable in the absence of high shear, as this will enable the uncured composition to be easily retained in the desired location of a cavity prior to completion of curing. This is advantageous since it avoids the need to contain the uncured composition within a bag or other device to prevent it from running out of the cavity. Generally speaking, it will be preferred for each of the components to have a viscosity within the range of about 150,000 to about 400,000 centipoise at room temperature.

Other optional components include diluents (reactive or non-reactive) such as glycidyl ethers, glycidyl esters, acrylics, solvents and plasticizers, toughening or flexibilizing agents (e.g., aliphatic diepoxides, polyaminoamides, liquid polysulfide polymers), wetting agents, adhesion promoters, coupling agents, anti-corrosion agents, surfactants, nucleating agents, odorants (e.g., pine oil), colorants (e.g., dyes and pigments such as carbon black), stabilizers (e.g., antioxidants, UV stabilizers) and the like. Especially preferred reactive diluents include the glycidyl ethers of monohydroxy phenols such as cresol and p-tert-butyl phenol (the latter glycidyl ether being preferred due to its lower volatility). It is particularly advantageous to include or more rubbers in the thermosettable composition, as such additives will toughen the thermoset and reduce the tendency of the thermoset to crack under stress. As used herein, the term "rubbers" includes both rubbers and elastomers. Suitable rubbers include thermoplastic as well as thermosettable (reactive) rubbers. Illustrative types of rubber include styrene-butadiene rubbers (SBR), nitrile-butadiene rubbers, butyl rubbers, polyisoprene, natural rubber, polybutadiene, chlorobutyl rubbers (neoprene), isobutylene polymers, alpha-olefin elastomers, ethylene-propylene elastomers, chlorosulfonated polyethylenes, ethylene-propylene-diene (EPDM) rubbers, and the like. Thermoplastic block copolymers are one particularly preferred class of rubbers for use in the present invention. Such materials contain one or more base segments ("A") covalently bonded to one or more soft or elastomeric segments ("B"). The A segments may be polystyrene, poly(alphamethylstyrene), polyethylene, polyurethane, polysulfone, polyester, polycarbonate or the like. The B segments may be polybutadiene, polyisoprene, poly(ethylenecobutylene), polydimethylsiloxane, polyether, or the like. The block copolymers may have a linear, branched, radial or star structure and may, for example, correspond to the general structure A-B-A, (A-B)-, and so forth. 515, SEBS and SBS block copolymers are examples of specific types of such materials.

Nitrile rubbers such as butadiene-acrylonitrile copolymers are an especially preferred type of rubber modifier when the thermosettable composition is expandable. Such rubbers are preferably liquid and may optionally be functionalized with carboxy groups, amine groups, or other groups capable of reacting with other ingredients of the thermosettable composition. Without wishing to be bound by theory it is believed that such rubbers may assist in limiting the reaction rate of the thermosettable composition and controlling the expansion, thereby producing a more uniform cell structure and better physical properties than are observed in the absence of such rubbers. The storage stability of Component B, when such component contains hollow glass microspheres in addition to the curative system, also is improved by the presence of such rubbers. That is, phase separation is generally inhibited when liquid nitrile rubbers are added to Component B. Storage stability is also enhanced by the addition of hydrophobic fumed silica and/or wollastonite.

The relative amounts of the above-described components may, in particular embodiments of the invention, correspond to the following ranges.

| Component A | Preferred | More Preferred |
| --- | --- | --- |
| Epoxy Resin | about 40 to about 85 wt % | about 55 to about 75 wt % |
| Reactive Diluent | 0 to about 25 wt % | about 1 to about 15 wt % |
| Rubber | 0 to about 20 wt % | about 0.1 to about 5 wt % |
| Hollow Glass Microspheres | 0 to about 50 wt % | about 5 to about 30 wt % |
| Thixotropic Agent | 0 to about 15 wt % | about 0.5 to about 7 wt % |
| Blowing System | about 1 to about 15 wt % | about 3 to about 12 wt % |
| High-temp. Blowing Agent | about 0.5 to about 10 wt % | about 2 to about 8 wt % |
| Low-temp. Blowing Agent | about 0.5 to about 5 wt % | about 1 to about 4 wt % |

| Component B | Preferred | More Preferred |
| --- | --- | --- |
| Curative System | about 0.5 to about 75 wt % | about 10 to about 60 wt % |
| Rubber | 0 to about 50 wt % | about 10 to about 30 wt |
| Thixotropic Agent | 0 to about 20 wt % | about 0.5 to about 8 wt % |
| Hollow Glass Microspheres | 0 to about 60 wt % | about 10 to about 50 wt % |

In an especially preferred embodiment of the invention, Component A comprises:

| | |
| --- | --- |
| Epoxy Resin[1] | about 60 to about 73 wt % |
| Reactive Diluent[2] | about 8 to about 9.9 wt % |
| Colorant | about 0.05 to about 0.2 wt % |
| Clay | about 1 to about 1.2 wt % |
| Calcium Oxide | about 1 to about 1.2 wt % |
| Fumed Silica | about 2.5 to about 3.1 wt % |
| Liquid Nitrile Rubber | about 0.1 to about 5 wt % |
| High-temperature Expandable Microspheres | about 2.5 to about 7.5 wt % |
| Low-temperature Expandable Microspheres | about 1 to about 3 wt % |
| Hollow Glass Microspheres | about 10 to about 17 wt % |

[1]preferably diglycidyl ether of bisphenol A, epoxy equivalent weight from about 170 to about 220
[2]preferably, glycidyl ether of mono-hydroxy phenolic compound, epoxy equivalent weight of about 150 to about 330

In an especially preferred embodiment of the invention, Component B comprises:

| | |
| --- | --- |
| Adduct of Epoxide/Aliphatic Polyamine Mixture[1] | about 8.5 to about 10.5 wt % |
| Aliphatic Polyamine/Polyhydric Phenol Mixture[2] | about 7 to about 11 wt % |
| Amidoamine/Aliphatic Polyamine[3] | about 23 to about 28 wt % |
| Liquid Nitrile Rubber | about 17 to about 23 wt % |
| Fumed Silica | about 3 to about 5 wt % |
| High Aspect Wollastonite | about 0.2 to about 0.5 wt % |
| Hollow Glass Microspheres | about 28 to about 34 wt % |
| Odorant | about 0.1 to about 1 wt % |

[1]preferably, adduct of triethylene tetramine (in excess) + tert-decanoic acid oxiranyl methyl ester; amine value about 870 to about 970; equivalent wt about 40 to about 50
[2]preferably, diethylene triamine and bisphenol A; amine value about 900 to about 1100; equivalent wt about 30 to about 40
[3]preferably, amidoamine based on tall oil fatty acid and tetraethylene pentamine (in excess); amine value about 440 to about 480; equivalent wt about 85 to about 90.

Using the preferred compositions of Component A and Component B described hereinabove, the preferred mixing ratio of Component A to Component B is from about 1.9:1 to about 2.7:1 (volume:volume).

The relative proportions of Component A and Component B are preferably selected such that the equivalents ratio of epoxy to amine is from about 0.5:1 to about 1:0.5, more preferably from about 0.65:1 to about 1:0.65, most preferably from about 0.8:1 to about 1:0.8. One of the important advantages of the present invention is that the physical and mechanical properties of the resulting thermoset (e.g., compression strength and compression modulus) are remarkably insensitive to the exact ratio of epoxy to amine achieved when the two components of the system are combined. Thus, minor variations in the relative proportions of Component A and Component B during mixing and processing will not have a significant impact on the performance of the structural reinforcing adhesive thereby produced.

The thermosettable compositions of the present invention may be utilized in any end-use application where an adhesive, sealant or coating is required. However, the thermosettable compositions are especially useful in the production of automobiles and other vehicles to maintain or increase the strength of structural members such as rockers, pillars, radiator support beams and the like. For example, an expandable thermosettable composition in accordance with the present invention may be pumped into a hollow joint of a vehicle such as a B pillar/roof joint, D pillar/sill joint, D pillar/roof joint or pillar/rocker joint and expanded and cured to provide a strong lightweight (low density) foam which bonds to the interior surfaces of the joint and increases the stiffness and torsional rigidity of the joint.

EXAMPLES

To determine the effect on varying the amount of blowing agent as used in the two-component foams of the prior art, the individual compositions of Component A for the following Examples were prepared by combining the first part of liquid epoxy resin and reactive diluent, mixing two minutes at low speed and then five minutes under high shear. Then, where applicable, the following materials are then added: carbon black, clay, pulverized calcium oxide (quick lime), fumed silica, and liquid nitrile rubber. The mixture is mixed for five minutes under low speed and then 15 minutes under high shear. Thereafter, hollow glass microspheres and the blowing system components are added and mixed 5 minutes at low speed and 10 minutes under high shear. Finally, the second part of liquid epoxy resin is added and mixed 3 minutes at low shear and 5 minutes under high shear. A vacuum (20–22 inches Hg) is applied and mixing continued at medium speed for 20 minutes to yield Component A.

Component B for use in each of the following examples is prepared by combining 78 pbw EPICURE 3295 curative (a mixture containing triethylene tetramine and an adduct of triethylene tetramine/tert-decanoic acid oxiranyl methyl ester, available from Shell Chemicals), 165 pbw NIPOL 1312 liquid nitrile rubber, 33 pbw NYAD G wollastonite (available from Nyco), and 74 pbw EPICURE 3271 curative (a mixture containing diethylene triamine and bisphenol A, available from Shell Chemicals), mixing at low speed until incorporated and then continuing mixing at high speed until the particles present in the mixture are completely dispersed. Thereafter, 210 pbw EPICURE 3055 curative (a mixture containing amidoamine based on tall oil fatty acid and tetraethylene pentamine, available from Shell Chemicals) and 4 pbw pine oil (used to improve the product odor) are added, mixed at low speed 3 minutes, mixed at high speed for 7 minutes, and then mixed under vacuum (20–22 inches Hg) for 20 minutes. The resulting Component B has the following composition, in weight percent:

| | |
|---|---|
| Aliphatic Polyamine + Aliphatic Polyamine/Glycidyl Ester Adduct Curative | 9.48 |
| Rubber | 20.05 |
| Fumed Silica | 4.01 |
| Wollastonite | 0.36 |
| Aliphatic Polyamine + Bisphenol A Curative | 8.99 |
| Amidoamine + Aliphatic Polyamine Curative | 25.52 |
| Hollow Glass Microspheres | 31.11 |
| Pine Oil | 0.49 |

Component A and Component B may be stored in suitable separate containers such as, for example, 55 gallon drums or 300 gallon totes. Each component exhibits exceptional storage stability, with little or no phase separation or increase in viscosity. The components are pumped out of the storage containers using a two part pump system such as, for example, the SCA 2K dispensing system supplied by Schucker. The components are conditioned at the desired preselected temperature for a suitable period of time (e.g. at least about half an hour) prior to mixing. Component A and Component B may be mixed by any suitable method such as feeding each component in the desired ratio into one end of a static mixer having an effective number of mixing elements. Using the specific formulations exemplified hereinabove, for instance, typically about 2 parts by volume of Component A is combined with about 1 part by weight of Component B (corresponding to a weight ratio of Component A to Component B of about 3:1) Thorough and complete mixing of the components is important to avoid the formation of incompletely cured regions in the final thermoset. To monitor the degree of mixing, it may be helpful to include a colorant such as carbon black in one component. Mixing is considered to be completed when the combined components exhibit a uniform coloration.

The mixture of Component A and Component B is thereafter introduced into the cavity or hollow section where structural reinforcement is desired. This may be readily accomplished by pumping, for example. The temperature of the mixture when dispensed is typically from about 30° C. to about 70° C. Generally speaking, a minimum of about 50 g (more preferably at least about 100 g; most preferably at least about 200 g) of the mixture should be employed in order to ensure an exotherm of sufficient magnitude to foam and cure the mixture within a desirably short period of time (unless, of course, heat is supplied from an outside source). The component mixture normally cures to a point where it is no longer pumpable within about 30 to about 60 minutes after the components are combined. This will depend to some extent, of course, on the initial temperature of the components, the reactivities of the constituents of each component, and other factors. Typically, complete or near complete cure is achieved within about 48 hours. One advantage of the present invention is that it is generally not necessary to apply external heat to accomplish or assist complete curing, although heat could be applied if so desired.

Comparative Example 1

To study the effect of using only the low-temperature blowing agent in the blowing system the inventors prepared following examples using the method described above. In this example, Component A was mixed with Component B described above at a 2:1 (by volume) ratio. The composition of component A, by weight percent is shown in TABLE 1 below.

TABLE 1

Composition of Component A (Low-temperature Blowing Agent Only)

|  | Example 1.1 | | Example 1.2 | | Example 1.3 | | Example 1.4 | |
| --- | --- | --- | --- | --- | --- | --- | --- | --- |
|  | (g) | (wt. %) | (g) | (wt. %) | (g) | (wt. %) | (g) | (wt. %) |
| Epoxy Resin[1] | 731.00 | 36.6% | 731.00 | 36.55% | 731.00 | 36.6% | 731.00 | 36.6% |
| Reactive Diluent[2] | 180.80 | 9.0% | 180.80 | 9.04% | 180.80 | 9.0% | 180.80 | 9.1% |
| Colorant[3] | 2.00 | 0.1% | 2.00 | 0.10% | 2.00 | 0.1% | 2.00 | 0.1% |
| Clay[4] | 22.00 | 1.1% | — | — | — | — | — | — |
| Calcium Oxide | 22.00 | 1.1% | 22.00 | 1.10% | 22.00 | 1.1% | 22.00 | 1.1% |
| Fumed Silica Filler[5] | 55.80 | 2.8% | 55.80 | 2.79% | 55.80 | 2.8% | 55.80 | 2.8% |
| Liquid Nitrile Rubber[6] | 24.20 | 1.2% | — | — | — | — | — | — |
| High-Temperature Blowing Agent[7] | — | — | — | — | — | — | — | — |
| Low-Temperature Blowing Agent[8] | 44.20 | 2.2% | 90.40 | 4.52% | 132.50 | 6.6% | 176.50 | 8.8% |
| Hollow Glass Microspheres[9] | 311.40 | 15.6% | 311.40 | 15.57% | 269.30 | 13.5% | 222.30 | 11.1% |
| Epoxy Resin[1] | 606.60 | 30.3% | 606.60 | 30.33% | 606.60 | 30.3% | 606.60 | 30.4% |

[1]EPON 828, a diglycidyl ether of bisphenol A, available from Shell Chemicals.
[2]PEP 6745 reactive diluent, available from Peninsula Polymers.
[3]MONARCH 120 carbon black, available from Cabot Chemical.
[4]CLAYTON AF clay, available from ECC International.
[5]CAB-O-SIL TS-720 from Cabot Chemical.
[6]NIPOL 1312 from Zeon.
[7]EXPANCEL 091 DU 140 expandable microspheres, available from Akzo Nobel AB.
[8]EXPANCEL 551 DU expandable microspheres, available from Akzo Nobel AB.
[9]SCOTCHLITE VS5500 hollow glass microspheres, available from 3M.

The inventors found that with high loadings of the blowing system comprising only the low-temperature blowing agent, the cohesive properties of the expanded foams degraded.

Comparative Example 2

To study the effect of only using the high-temperature blowing agent in the blowing system, the inventors prepared the following examples using the method of Example 1. Component A was then mixed with the Component B of Example 1 at a 2:1 (by volume) ratio. The composition of Component A used in these examples is shown in Table 2 below.

TABLE 2

Composition of Component A
(High-temperature Blowing Agent Only)

|  | Example 2.1 | | Example 2.2 | | Example 2.3 | |
| --- | --- | --- | --- | --- | --- | --- |
|  | (g) | (wt. %) | (g) | (wt. %) | (g) | (wt. %) |
| Epoxy Resin[1] | 731.00 | 36.6% | 731.00 | 36.6% | 731.00 | 36.6% |
| Reactive Diluent[2] | 180.80 | 9.0% | 180.80 | 9.0% | 180.80 | 9.0% |
| Colorant[3] | 2.00 | 0.1% | 2.00 | 0.1% | 2.00 | 0.1% |
| Clay[4] | 22.00 | 1.1% | — | — | — | — |
| Calcium Oxide | 22.00 | 1.1% | 22.00 | 1.1% | 22.00 | 1.1% |
| Fumed Silica Filler[5] | 55.80 | 2.8% | 55.80 | 2.8% | 55.80 | 2.8% |
| Liquid Nitrile Rubber[6] | 24.20 | 1.2% | — | — | — | — |
| High-Temperature Blowing Agent[7] | 44.20 | 2.2% | 90.40 | 4.5% | 176.50 | 8.8% |
| Low-Temperature Blowing Agent[8] | — | — | — | — | — | — |
| Hollow Glass Microspheres[9] | 311.40 | 15.6% | 311.40 | 15.6% | 225.30 | 11.3% |
| Epoxy Resin[1] | 606.60 | 30.3% | 606.60 | 30.3% | 606.60 | 30.3% |

[1]EPON 828, a diglycidyl ether of bisphenol A, available from Shell Chemicals.
[2]PEP 6745 reactive diluent, available from Peninsula Polymers.
[3]MONARCH 120 carbon black, available from Cabot Chemical.
[4]CLAYTON AF clay, available from ECC International.
[5]CAB-O-SIL TS-720 from Cabot Chemical.
[6]NIPOL 1312 from Zeon.
[7]EXPANCEL 091 DU 140 expandable microspheres, available from Akzo Nobel AB.
[8]EXPANCEL 551 DU expandable microspheres, available from Akzo Nobel AB.
[9]SCOTCHLITE VS5500 hollow glass microspheres, available from 3M.

Example 3

To study the effect of only using lower levels of the blowing system to achieve about 100 percent expansion, the inventors prepared the following examples using the method of Example 1. Component A was then mixed with the Component B of Example 1 at a 2:1 (by volume) ratio. The composition of Component A used in these examples is shown in Table 3 below. A second batch of the composition of example 3.2 was prepared and tested using a different lot number of the Component B.

TABLE 3

Composition of Component A
(High and Low-temperature Blowing Agent)

|  | Example 3.1 | | Example 3.2 | | Example 3.3 | |
| --- | --- | --- | --- | --- | --- | --- |
|  | (g) | (wt. %) | (g) | (wt. %) | (g) | (wt. %) |
| Epoxy Resin[1] | 731.00 | 36.6% | 731.00 | 36.6% | 731.00 | 36.2% |
| Reactive Diluent[2] | 180.80 | 9.0% | 180.80 | 9.0% | 180.80 | 9.0% |
| Colorant[3] | 2.00 | 0.1% | 2.00 | 0.1% | 2.00 | 0.1% |
| Clay[4] | — | — | — | — | — | — |
| Calcium Oxide | 22.00 | 1.1% | 22.00 | 1.1% | 22.00 | 1.1% |
| Fumed Silica Filler[5] | 55.80 | 2.8% | 55.80 | 2.8% | 55.80 | 2.8% |
| Liquid Nitrile Rubber[6] | — | — | — | — | — | — |
| High-Temperature Blowing Agent[7] | — | — | 80.00 | 4.0% | 60.00 | 3.0% |
| Low-Temperature Blowing Agent[8] | 60.00 | 3.0% | 20.00 | 1.0% | 60.00 | 3.0% |
| Hollow Glass Microspheres[9] | 341.80 | 17.1% | 301.80 | 15.1% | 301.80 | 14.9% |
| Epoxy Resin[1] | 606.60 | 30.3% | 606.60 | 30.3% | 606.60 | 30.0% |

[1]EPON 828, a diglycidyl ether of bisphenol A, available from Shell Chemicals.
[2]PEP 6745 reactive diluent, available from Peninsula Polymers.
[3]MONARCH 120 carbon black, available from Cabot Chemical.
[4]CLAYTON AF clay, available from ECC International.
[5]CAB-O-SIL TS-720 from Cabot Chemical.
[6]NIPOL 1312 from Zeon.
[7]EXPANCEL 091 DU 140 expandable microspheres, available from Akzo Nobel AB.
[8]EXPANCEL 551 DU expandable microspheres, available from Akzo Nobel AB.
[9]SCOTCHLITE VS5500 hollow glass microspheres, available from 3M.

Example 4

To study the effect of only using different ratios of the high-temperature blowing agent and the low-temperature blowing agent in the blowing system, the inventors prepared the following examples using the method of Example 1. Component A was then mixed with the Component B of Example 1 at a 2:1 (by volume) ratio. The composition of Component A used in these examples is shown in Table 4 below.

TABLE 4

Composition of Component A (High and Low-temperature Blowing Agent)

|  | Example 4.1 | | Example 4.2 | | Example 4.3 | | Example 4.4 | |
| --- | --- | --- | --- | --- | --- | --- | --- | --- |
|  | (g) | (wt. %) | (g) | (wt. %) | (g) | (wt. %) | (g) | (wt. %) |
| Epoxy Resin[1] | 731.00 | 36.6% | 731.00 | 36.6% | 731.00 | 36.6% | 731.00 | 36.6% |
| Reactive Diluent[2] | 180.80 | 9.0% | 180.80 | 9.0% | 180.80 | 9.0% | 180.80 | 9.0% |
| Colorant[3] | 2.00 | 0.1% | 2.00 | 0.1% | 2.00 | 0.1% | 2.00 | 0.1% |
| Clay[4] | — | — | — | — | — | — | — | — |
| Calcium Oxide | 22.00 | 1.1% | 22.00 | 1.1% | 22.00 | 1.1% | 22.00 | 1.1% |
| Fumed Silica Filler[5] | 55.80 | 2.8% | 55.80 | 2.8% | 55.80 | 2.8% | 55.80 | 2.8% |
| Liquid Nitrile Rubber[6] | — | — | — | — | — | — | — | — |
| High-Temperature Blowing Agent[7] | 100.00 | 5.0% | 120.00 | 6.0% | 140.00 | 7.0% | 100.00 | 5.0% |
| Low-Temperature Blowing Agent[8] | 20.00 | 1.0% | 20.00 | 1.0% | 20.00 | 1.0% | 40.00 | 2.0% |
| Hollow Glass Microspheres[9] | 281.80 | 14.1% | 261.80 | 13.1% | 241.80 | 12.1% | 261.80 | 13.1% |
| Epoxy Resin[1] | 606.60 | 30.3% | 606.60 | 30.3% | 606.60 | 30.3% | 606.60 | 30.3% |

[1]EPON 828, a diglycidyl ether of bisphenol A, available from Shell Chemicals.
[2]PEP 6745 reactive diluent, available from Peninsula Polymers.
[3]MONARCH 120 carbon black, available from Cabot Chemical.
[4]CLAYTON AF clay, available from ECC International.
[5]CAB-O-SIL TS-720 from Cabot Chemical.
[6]NIPOL 1312 from Zeon.
[7]EXPANCEL 091 DU 140 expandable microspheres, available from Akzo Nobel AB.
[8]EXPANCEL 551 DU expandable microspheres, available from Akzo Nobel AB.
[9]SCOTCHLITE VS5500 hollow glass microspheres, available from 3M.

Example 5

To study the effect of only using a 4:2 weight ratio of the high-temperature blowing agent and the low-temperature blowing agent in the blowing system, the inventors prepared the following example using the method of Example 1. Component A was then mixed with the Component B of Example 1 at a 2:1 (by volume) ratio. The composition of Component A used in this example is shown in Table 5 below.

TABLE 5

Composition of Component A
(High and Low-temperature Blowing Agent)

| | Example 5 | |
|---|---|---|
| | (g) | (wt. %) |
| Epoxy Resin[1] | 731.00 | 36.6% |
| Reactive Diluent[2] | 180.80 | 9.0% |
| Colorant[3] | 2.00 | 0.1% |
| Clay[4] | — | — |
| Calcium Oxide | 22.00 | 1.1% |
| Fumed Silica Filler[5] | 55.80 | 2.8% |
| Liquid Nitrile Rubber[6] | — | — |
| High-Temperature Blowing Agent[7] | 80.00 | 4.0% |
| Low-Temperature Blowing Agent[8] | 40.00 | 2.0% |
| Hollow Glass Microspheres[9] | 281.80 | 14.1% |
| Epoxy Resin[1] | 606.60 | 30.3% |

[1]EPON 828, a diglycidyl ether of bisphenol A, available from Shell Chemicals.
[2]PEP 6745 reactive diluent, available from Peninsula Polymers.
[3]MONARCH 120 carbon black, available from Cabot Chemical.
[4]CLAYTON AF clay, available from ECC International.
[5]CAB-O-SIL TS-720 from Cabot Chemical.
[6]NIPOL 1312 from Zeon.
[7]EXPANCEL 091 DU 140 expandable microspheres, available from Akzo Nobel AB.
[8]EXPANCEL 551 DU expandable microspheres, available from Akzo Nobel AB.
[9]SCOTCHLITE VS5500 hollow glass microspheres, available from 3M.

Example 6

To obtain a foam with an expansion ratio of from about 90 to about 110 percent, the inventors prepared the following examples using the method of Example 1. Component A was then mixed with the Component B of Example 1 at a 2:1 (by volume) ratio. The composition of Component A used in this example is shown in Table 6 below. Three batches of the same composition were tested for compression strength and modulus.

TABLE 6

Composition of Component A
(High and Low-temperature Blowing Agent)

| | Example 6 | |
|---|---|---|
| | (g) | (wt. %) |
| Epoxy Resin[1] | 5117.0 | 36.6% |
| Reactive Diluent[2] | 1265.6 | 9.0% |
| Colorant[3] | 14.0 | 0.1% |
| Clay[4] | — | — |
| Calcium Oxide | 154.0 | 1.1% |
| Fumed Silica Filler[5] | 390.6 | 2.8% |
| Liquid Nitrile Rubber[6] | — | — |
| High-Temperature Blowing Agent[7] | 630.0 | 4.5% |
| Low-Temperature Blowing Agent[8] | 252.0 | 1.8% |
| Hollow Glass Microspheres[9] | 1930.6 | 13.8% |
| Epoxy Resin[1] | 4246.2 | 30.3% |

[1]EPON 828, a diglycidyl ether of bisphenol A, available from Shell Chemicals.
[2]PEP 6745 reactive diluent, available from Peninsula Polymers.
[3]MONARCH 120 carbon black, available from Cabot Chemical.
[4]CLAYTON AF clay, available from ECC International.
[5]CAB-O-SIL TS-720 from Cabot Chemical.
[6]NIPOL 1312 from Zeon.
[7]EXPANCEL 091 DU 140 expandable microspheres, available from Akzo Nobel AB.
[8]EXPANCEL 551 DU expandable microspheres, available from Akzo Nobel AB.
[9]SCOTCHLITE VS5500 hollow glass microspheres, available from 3M.

Results

The measured physical properties of the above examples can be seen in Table 7 below.

TABLE 7

Physical Properties of Example Foams

| Example | Calc. SG (cured) | Expansion (%) | Comp. Str. (MPa) | Modulus (MPa) | SG (cylinder) | Comments |
|---|---|---|---|---|---|---|
| 1.1 | 0.509 | 54.2% | 22.0 | 1025.0 | 0.51 | good cell structure |
| 1.2 | 0.502 | 56.2% | 18.0 | 995.0 | 0.50 | large cavities in sample |
| 1.3 | 0.485 | 61.8% | 15.7 | 911.0 | 0.48 | poor cell structure, large cavities |
| 1.4 | 0.449 | 74.8% | 14.8 | 726.0 | 0.45 | poor cell structure, large cavities |
| 2.1 | 0.603 | 30.2% | 32.8 | 1441.2 | 0.60 | cohesive |
| 2.2 | 0.491 | 59.9% | 24.3 | 1074.3 | 0.49 | non-cohesive, no surface expansion |
| 2.3 | 0.388 | 102.3% | 14.9 | 701.6 | 0.39 | non-cohesive, no surface expansion |
| 3.1 | 0.450 | 76.0% | 13.8 | 804.9 | 0.45 | low expansion |
| 3.2 (1) | 0.450 | 77.0% | 18.7 | 871.7 | 0.45 | good cell structure, low expansion |
| 3.2 (2) | 0.482 | 67.1% | 20.1 | 965.0 | 0.48 | good cell structure, low expansion |
| 3.3 | 0.370 | 118.0% | 7.9 | 543.2 | 0.37 | good cell structure |
| 4.1 | 0.442 | 83.2% | 16.7 | 804.0 | 0.44 | good cell structure, low expansion |
| 4.2 | 0.422 | 93.0% | 14.7 | 710.0 | 0.42 | good cell structure, expansion, and modulus |
| 4.3 | 0.375 | 118.5% | 12.5 | 603.0 | 0.37 | good cell structure and modulus, high expansion |

TABLE 7-continued

Physical Properties of Example Foams

| Example | Calc. SG (cured) | Expansion (%) | Comp. Str. (MPa) | Modulus (MPa) | SG (cylinder) | Comments |
|---|---|---|---|---|---|---|
| 4.4 | 0.354 | 129.7% | 10.2 | 493.0 | 0.35 | good cell structure, low modulus |
| 5 | 0.321 | 153.0% | 8.6 | 436.0 | 0.32 | good cell structure, low modulus |
| 6 (1) | 0.382 | 95.0% | 11.9 | 615.6 | 0.38 | cohesive, excellent cell structure, expansion, and modulus |
| 6 (2) | 0.379 | 96.9% | 11.6 | 602.0 | 0.38 | cohesive, excellent cell structure, expansion, and modulus |
| 6 (3) | 0.372 | 100.7% | 11.1 | 576.4 | 0.37 | cohesive, excellent cell structure, expansion, and modulus |

From Table 7, it can be seen that the blowing system of the present invention provides for expanded foams that can obtain about 100 percent expansion, are lightweight, and have a reasonable degree of strength.

While the invention has been particularly shown and described with reference to preferred embodiments thereof, it will be understood by those skilled in the art that various changes in form and details may be made without departing from the spirit and scope of the invention as defined in the appended claims.

We claim:

1. A two component system capable of being cured to provide a structural reinforcement adhesive, said two component system comprising a Component A and a Component B, wherein said Component A comprises at least one epoxy resin and Component B comprises a curing system that comprises at least one amine curative, and wherein said two-component system comprises a blowing system that comprises at least one high-temperature thermally-activated blowing agent and at least one low-temperature thermally-activated blowing agent, wherein the high- and low-temperature blowing agents are present at a weight ratio in the range of from about 1:1 to about 7:1 respectively, wherein said at least one high-temperature thermally-activated blowing agent has an onset temperature in the range of from about 110° C. to about 150° C., wherein said at least one low-temperature thermally-activated blowing agent has an onset temperature in the range of from about 75° C. to about 105° C., and wherein said high- and low-temperature thermally-activated blowing agents each comprise expandable microspheres.

2. The two component system of claim 1, wherein said weight ratio is in the range of from about 2:1 to 6:1.

3. The two component system of claim 1 wherein the at least one high-temperature thermally-activated blowing agent has an onset temperature in the range of from about 110° C. to about 130° C. and wherein said at least one low-temperature thermally-activated blowing agent has an onset temperature in the range of from about 90° C. to about 100° C.

4. The two component system of claim 1 wherein the at least one high-temperature thermally-activated blowing agent has a maximum temperature in the range of from about 165° C. to about 210° C. and wherein said at least one low-temperature thermally-activated blowing agent has a maximum temperature in the range of from about 115° C. to about 150° C.

5. The two component system of claim 1 wherein the at least one high-temperature thermally-activated blowing agent has a maximum temperature in the range of from about 180° C. to about 195° C. and wherein said at least one low-temperature thermally-activated blowing agent has a maximum temperature in the range of from about 135° C. to about 150° C.

6. The two component system of claim 1 wherein the at least one high-temperature thermally-activated blowing agent has a maximum temperature greater than the internal temperature of the adhesive during curing and wherein said at least one low-temperature thermally-activated blowing agent has a maximum temperature less than the internal temperature of the adhesive during curing.

7. The two component system of claim 1 wherein said Component A comprises from about 0.5 to about 10 wt % high-temperature thermally-activated blowing agent and from about 0.5 to about 5 wt % low-temperature thermally-activated blowing agent.

8. The two component system of claim 1 wherein said Component A comprises from about 2 to about 8 wt % high-temperature thermally-activated blowing agent and from about 1 to about 4 wt % low-temperature thermally-activated blowing agent.

9. The two component system of claim 1 wherein said Component A comprises at least one epoxy resin which is a glycidyl ether of a polyhydric phenol.

10. The two component system of claim 1 wherein the curative system of Component B comprises at least one aliphatic polyamine, at least one amidoamine, at least one alcohol, and at least one adduct of a polyamine and an epoxide.

11. A two component system capable of being expanded and cured to provide a structural reinforcement foam, said two component system comprising a Component A and a Component B, wherein said Component A comprises:

at least one epoxy resin which is a glycidyl ether of a polyhydric phenol;

hollow inorganic microspheres;

a blowing system comprising at least one high-temperature thermally-activated blowing agent and at least one low-temperature thermally-activated blowing agent, wherein said at least one high-temperature thermally-activated blowing agent has an onset temperature in the range of from about 110° C. to about 150° C., wherein said at least one low-temperature thermally-activated blowing agent has an onset temperature in the range of from about 75° C. to about 105° C., and wherein said high- and low-temperature thermally-activated blowing agents each comprise expandable microspheres;

and wherein said Component B comprises:

a curative system comprising at least one amine curative; and hollow inorganic microspheres.

12. The two component system of claim 11 wherein Component A comprises at least one epoxy resin which is a diglycidyl ether of bisphenol A.

13. The two component system of claim 11 wherein the at least one high-temperature thermally-activated blowing agent has an onset temperature in the range of from about 110° C. to about 125° C. and wherein said at least one low-temperature thermally-activated blowing agent has an onset temperature in the range of from about 90° C. to about 100° C.

14. The two component system of claim 11 wherein the high- and low-temperature blowing agents are present at a weight ratio in the range of from about 1:1 to about 7:1 respectively.

15. The two component system of claim 11 wherein the curative system of Component B comprises:
at least one aliphatic polyamine;
at least one amidoamine;
at least one alcohol; and
at least one adduct of a polyamine and an epoxide.

16. The two component system of claim 15 wherein at least one aliphatic polyamine corresponds to the generic structure

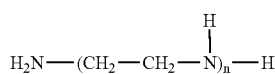

wherein n=1–6.

17. The two component system of claim 15 wherein at least one amidoamine is an aliphatic amidoamine prepared by reacting an aliphatic polyamine with a fatty acid.

18. The two component system of claim 15 wherein at least one alcohol is an aromatic alcohol.

19. The two component system of claim 15 wherein at least one alcohol is a polyhydric phenol.

20. The two component system of claim 15 wherein at least one alcohol is bisphenol A.

21. The two component system of claim 15 wherein at least one adduct is an adduct of an aliphatic polyamine corresponding to the general structure

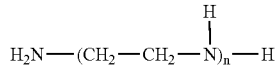

wherein n=1–6.

22. The two component system of claim 15 wherein at least one adduct is an adduct of a glycidyl ester.

23. The two component system of claim 15 wherein at least one adduct is an adduct of a glycidyl ester of $C_2$–$C_{24}$ aliphatic carboxylic acid.

24. The two component system of claim 11 wherein Component A has the following composition:

| | |
|---|---|
| Epoxy Resin | about 55 to about 75 wt %; |
| Reactive Diluent | about 1 to about 15 wt %; |
| Rubber | about 0.1 to about 5 wt %; |
| Hollow Glass Microspheres | about 5 to about 30 wt %; |
| Thixotropic Agent | about 0.5 to about 7 wt %; and |
| Blowing System | about 1 to about 15 wt %. |

25. The two component system of claim 11 wherein Component B has the following composition:

| | |
|---|---|
| Aliphatic Polyamine | about 1 to about 20 wt %; |
| Amidoamine | about 10 to about 35 wt %; |
| Alcohol | about 0.5 to about 10 wt %; |
| Adduct of Polyamine and Epoxide | about 0.5 to about 10 wt %; |
| Rubber | about 10 to about 30 wt %; |
| Thixotropic Agent | about 0.5 to about 8 wt %; and |
| Hollow Glass Microspheres | about 10 to about 50 wt %. |

26. The two component system of claim 11 wherein said Component A comprises from about 0.5 to about 10 wt % high-temperature thermally-activated blowing agent and from about 0.5 to about 5 wt % low-temperature thermally-activated blowing agent.

27. The two component system of claim 11 wherein said Component A comprises from about 2 to about 8 wt % high-temperature thermally-activated blowing agent and from about 1 to about 4 wt % low-temperature thermally-activated blowing agent.

28. The two component system of claim 11 wherein said Component A comprises about 4.5 wt % high-temperature thermally-activated blowing agent and about 1.8 wt % low-temperature thermally-activated blowing agent, and wherein the high-temperature thermally-activated blowing agent and the low-temperature thermally-activated blowing agent each are expandable microspheres.

29. A method of curing a thermosettable composition comprised of:
(a) at least one epoxy resin;
(b) hollow glass microspheres; and
(c) a blowing system comprising:
(i) at least one high-temperature thermally-activated blowing agent, wherein said at least one high-temperature thermally-activated blowing agent comprises expandable microspheres and has an onset temperature in the range of from about 110° C. to about 150° C., and
(ii) at least one low-temperature thermally-activated blowing agent, wherein said at least one low-temperature thermally-activated blowing agent comprises expandable microspheres and has an onset temperature in the range of from about 75° C. to about 105° C.;
said method comprising combining said thermosettable composition with a curative system comprising at least one amine curative and initiating exothermic reaction of the thermosettable composition and the curative system.

30. A method of preparing a structural reinforcing foam comprising combining:
(a) at least one epoxy resin;
(b) hollow glass microspheres;
(c) a blowing system comprising:
(i) at least one high-temperature thermally-activated blowing agent, wherein said at least one high-temperature thermally-activated blowing agent comprises expandable microspheres and has an onset temperature in the range of from about 110° C. to about 150° C., and
(ii) at least one low-temperature thermally-activated blowing agent, wherein said at least one low-temperature thermally-activated blowing agent comprises expandable microspheres and has an onset temperature in the range of from about 75° C. to about 105° C.; and (d) a curative system comprising at least one amine curative;

and initiating exothermic reaction of (a) and (d) and expansion of the blowing system.

31. A method of reinforcing a substrate having a surface, said method comprising combining at least one epoxy resin, hollow glass microspheres, and a blowing system comprised of at least one high-temperature thermally-activated blowing agent, and at least one low-temperature thermally-activated blowing agent, wherein said at least one high-temperature thermally-activated blowing agent has an onset temperature in the range of from about 110° C. to about 150° C., wherein said at least one low-temperature thermally-activated blowing agent has an onset temperature in the range of from about 75° C. to about 105° C., and wherein said high- and low-temperature thermally-activated blowing agents each comprise expandable microspheres; and a curative system comprised of at least one amine curative to form a mixture, applying said mixture to said surface, and curing said mixture.

32. A method of reinforcing a structural member having a cavity, said method comprising:

(A) combining (a) at least one epoxy resin;

(b) hollow glass microspheres; and (c) a blowing system comprising:

(i) at least one high-temperature thermally-activated blowing agent, wherein said at least one high-temperature thermally-activated blowing agent comprises expandable microspheres and has an onset temperature in the range of from about 110° C. to about 150° C., and (ii) at least one low-temperature thermally-activated blowing agent, wherein said at least one low-temperature thermally-activated blowing agent comprises expandable microspheres and has an onset temperature in the range of from about 75° C. to about 105° C.; and (d) a curative system comprised of at least one amine curative to form a pumpable mixture;

(B) introducing said pumpable mixture into said cavity; and (C) curing and expanding said pumpable mixture to provide a structural reinforcement foam within said cavity.

\* \* \* \* \*